Patented Nov. 11, 1941

2,262,523

UNITED STATES PATENT OFFICE 2,262,523

INSECTICIDE

Raymond F. Bacon, Bronxville, N. Y., and Isaac Bencowitz, Newgulf, Tex., assignors to Texas Gulf Sulphur Company, Houston, Tex., a corporation of Texas No Drawing. Application September 21, 1938, Serial No. 231,020

5 Claims. (Cl. 167—20)

This invention relates to pest control and has for an object the provision of an improved material for use in controlling plant pests. A further object of the invention is to provide a dusting material having improved insecticidal and fungicidal properties.

The material or product of our invention may consist essentially of a reaction product resulting from heating sulphur with rosin under controlled conditions, or it may comprise a mixture of such a reaction product with one or more suitable diluent materials such as sulphur or indifferent diluent materials.

Dusting and spraying materials of various compositions are employed commonly for the purpose of preventing destruction of plants by insects and parasitic fungi. Many of these insecticidal and fungicidal materials contain sulphur and, in most cases, a profusion of other ingredients. Powdered sulphur itself has also been used with success, although its tendency to cake and the difficulty of causing it to cling to the surfaces of plants under certain weather conditions have at times proved disadvantageous. Partly because of these disadvantages, powdered sulphur is in some cases considered inferior to the various more or less complicated compositions containing sulphur which have been advocated for use as insecticides and fungicides, in spite of the fact that sulphur is an excellent insecticide and fungicide.

Our invention has for its object the provision of a composition or material, prepared in a simple manner from sulphur and rosin, which will not only resist caking and adhere to plant surfaces on which it is dusted, but which will also be more toxic to insects and fungi than is sulphur itself. The improved product of our invention, which may be mixed with additional sulphur in finely divided form, assists the sulphur in clinging to the surfaces to which the mixture is applied and tends to inhibit caking, thus permitting the excellent insecticidal and fungicidal properties of sulphur to be utilized.

The products of our invention are formed by heating a mixture of elemental sulphur and rosin to temperatures sufficiently high to cause the sulphur and rosin of the mixture to react chemically. At the necessary temperatures, the mixture is molten, and a molten reaction product is obtained. The molten reaction product may be solidified by cooling and pulverized or finely ground for use.

Rosin from any suitable source may be employed in practicing our invention, but we prefer to employ the residue remaining after distillation of the volatile oils from the oleoresins of coniferous trees such as pine trees.

In forming the improved products of our invention, rosin and sulphur may be employed in any suitable proportions so long as the mixture is heated to a sufficiently high temperature definitely to effect a chemical reaction between the rosin and the sulphur. In order to effect a chemical reaction of the desired type, we have found it necessary to heat the mixture to a temperature not substantially lower than 170° C. We prefer to heat the mixture to a temperature of about 200° C. in order to accelerate the reaction, but good results can be obtained by heating to lower temperatures in the range 170° C. to 200° C.

While rosin and sulphur in any suitable proportions may be employed, we have found that the use of mixtures containing rosin and elemental sulphur in which the rosin is present in an amount equal to about ten to thirty percent of the total weight of the sulphur and rosin results in the production of products having the more desirable insecticidal and fungicidal properties. The products of our invention having the most desirable insecticidal and fungicidal properties have been obtained through the use of reaction mixtures comprising rosin and elemental sulphur in which the amount of rosin is equal to about thirty percent of the total weight of the sulphur and rosin.

In carrying out the method of our invention, the mixtures may be heated for any suitable periods of time which will result in the completion of the desired reactions. We have found that the reactions proceed to satisfactory degrees of completion when mixtures containing rosin in an amount equal to ten to thirty percent of the total weight of the rosin and sulphur are heated to temperatures in the range of 170° C. to 200° C. for periods of time ranging from one and one-half to two hours. The product of reaction probably consists, partly or largely, of retene.

In practicing the method of our invention to produce the product of our invention, elemental sulphur and rosin may be melted together, preferably in a direct fire heated kettle. Steam-jacketed kettles may be employed, but they are more expensive to use than direct fire heated kettles. Both may be melted together, or either may be melted first and the other added to the molten mass. In melting, the materials are heated to temperatures such as to provide sufficient fluidity for thorough mixing with the production of a substantially homogeneous mass. Temperatures between 115° C. and 150° C. usually are satisfactory for the melting operation. The molten mass is stirred thoroughly, and, when satisfactory mixing has been accomplished, the temperature is raised sufficiently high to permit the desired chemical reaction to take place between the sulphur and the rosin.

When reaction to the desired degree has taken place, the reaction product may be removed from the reaction vessel by pouring. After standing for about twenty-four hours under cooling conditions, the reaction product becomes a yellowish brown solid mass which can be pulverized readily. The solidified reaction product may be pulverized alone and used alone for insecticidal and germicidal purposes, or it may be mixed with diluent materials such as sulphur during or after the pulverizing or grinding operation.

We have found the products prepared in accordance with our invention to be very effective in the eradication of apple scab, as well as in the control of chewing insects, such as the codling moth, bud moth, leaf rollers and plum curculio, and sucking insects, such as the apple red bug and aphids.

We claim:

1. An insecticide and fungicide comprising a finely divided product obtained by fusing a mixture containing elemental sulphur and an amount of rosin equal to not less than about ten percent of the total weight of the sulphur and rosin, heating the fused mixture to a temperature and for a period of time such as to effect a chemical reaction between the sulphur and the rosin, cooling the resulting product, and finely dividing the cooled product.

2. An insecticide and fungicide comprising a product obtained by fusing a mixture containing elemental sulphur and an amount of rosin equal to about ten to thirty percent of the total weight of the sulphur and rosin, heating the fused mixture to a temperature of about 170° C. to 200° C. for about one and one-half to two hours, cooling the resulting product, and finely dividing the cooled product.

3. An insecticide and fungicide comprising a product obtained by fusing a mixture containing elemental sulphur and an amount of rosin equal to about ten to thirty percent of the total weight of the sulphur and rosin, heating the fused mixture to a temperature of about 170° C. to 200° C. for about one and one-half to two hours, and mixing the resulting product in finely divided form with a finely divided, solid diluent material.

4. Method of controlling pests and preserving plants, comprising dusting plants with a product obtained by fusing a mixture containing elemental sulphur and an amount of rosin equal to not less than about ten percent of the total weight of the sulphur and rosin, heating the fused mixture to a temperature and for a period of time such as to effect a chemical reaction between the sulphur and the rosin, and finely dividing the product.

5. Method of controlling pests and preserving plants, comprising dusting plants with a product obtained by fusing a mixture containing elemental sulphur and an amount of rosin equal to about ten to thirty percent of the total weight of the sulphur and rosin, heating the fused mixture to a temperature and for a period of time such as to effect a chemical reaction between the sulphur and the rosin, cooling the resulting product, and finely dividing the cooled product.

RAYMOND F. BACON.
ISAAC BENCOWITZ.